(12) United States Patent
Shakhnovich

(10) Patent No.: US 6,228,910 B1
(45) Date of Patent: May 8, 2001

(54) WEATHERABLE COLORED RESIN COMPOSITIONS

(75) Inventor: Alexander Isaakovich Shakhnovich, Schenectady, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/398,151

(22) Filed: Sep. 16, 1999

(51) Int. Cl.[7] ................................ C08K 5/34; C08K 5/08
(52) U.S. Cl. ........................ 524/88; 524/358; 524/359; 524/500; 524/612
(58) Field of Search .................... 524/88, 358, 359, 524/500, 612

(56) References Cited

U.S. PATENT DOCUMENTS 3,460,961   8/1969   Young et al. .
5,371,170 * 12/1994   Sakashita et al. ................. 528/198

FOREIGN PATENT DOCUMENTS 199841   8/1989   (JP) .

* cited by examiner

*Primary Examiner*—Kriellion Sanders
(74) *Attorney, Agent, or Firm*—S. Bruce Brown; Noreen C. Johnson

(57) ABSTRACT

Color stability of resinous compositions containing dyes which undergo chemical degradation upon exposure to ultraviolet radiation in the wavelength range of 300–400 nm is improved by incorporating therein an arylate polymer which is a 1,3-dihydroxybenzene isophthalate/terephthalate, preferably a resorcinol isophthalate/terephthalate. Other resins may also be present.

14 Claims, No Drawings

WEATHERABLE COLORED RESIN COMPOSITIONS

BACKGROUND OF THE INVENTION

This invention relates to coloration of synthetic resins, and more particularly to the provision of weatherable colored resins.

With the ever-expanding areas of use of synthetic resins and especially thermoplastic resins, it is of increasing interest to produce resinous compositions having many types of surface appearance, including coloration. Coloration of resins can be achieved by the use of dyes or pigments. One of the characteristics of pigments is their insolubility in the resin phase, which can lead to adverse consequences including loss of physical properties and loss of surface gloss. It is often preferred, therefore, to employ dyestuffs for coloration since they dissolve in the resin, forming a homogeneous composition which retains the gloss and advantageous physical properties characteristic of the neat resin.

A factor of concern in the coloration of synthetic resins is weatherability. Many dyes and other industrial colorants undergo photodegradation upon exposure to radiation of various wavelengths, often in the ultraviolet region of the spectrum. Thus, the resinous articles containing such colorants suffer a loss of color.

It is of increasing interest, therefore, to produce substantially color-stable resinous articles. It is of further interest to produce articles having a high degree of resistance to weathering and the color changes caused thereby.

SUMMARY OF THE INVENTION

The present invention is based on the discovery that certain arylate polymers absorb radiation in a region of the ultraviolet spectrum that can adversely affect the coloration of many dyes and other colorants for resins. In particular, such arylate polymers absorb in the 300–400 nm region. Thus, their presence protects the colorants from photodegradation and improves color stability.

One aspect of the invention, therefore, is resinous compositions comprising the following and any reaction products thereof:

(A) an arylate polymer which is a 1,3-dihydroxybenzene isophthalate/terephthalate comprising structural units of the formula

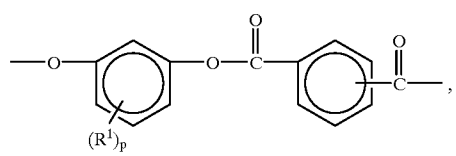

(I)

optionally in combination with structural units of the formula

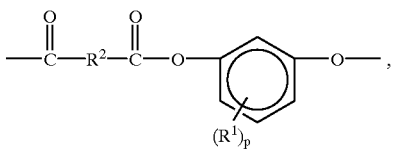

(II)

wherein each $R^1$ is a substituent, $R^2$ is a divalent $C_{3-20}$ aliphatic, alicyclic or mixed aliphatic-alicyclic radical and p is 0–3; and (B) at least one dye which undergoes chemical degradation upon exposure to ultraviolet radiation in the wavelength range of 300–400 nm.

Another aspect of the invention is resinous compositions comprising components A and B as defined above, and (C) at least one resin different from component A, and any reaction products thereof.

DETAILED DESCRIPTION; PREFERRED EMBODIMENTS

For the sake of brevity, the constituents of the compositions of this invention are defined as "components" irrespective of whether a reaction between said constituents occurs at any time. Thus, the compositions may include said components and any reaction products thereof.

Component A, the arylate polymer, is a 1,3-dihydroxybenzene isophthalate/terephthalate comprising structural units of formula I. It may also contain other acid groups, such as those derived from aliphatic dicarboxylic acids such as succinic acid, adipic acid or cyclohexane-1,4-dicarboxylic acid, or from other aromatic dicarboxylic acids such as 2,6-naphthalenedicarboxylic acid, preferably in amounts no greater than about 30 mole percent. Most often, however, the base polymer consists of units of formula I, optionally in combination with units of formula II.

The units of formula I contain a resorcinol or substituted resorcinol moiety in which any $R^1$ groups are halo or $C_{1-12}$ alkyl or a mixture thereof, and p has the value of 0–3. Preferably $R^1$ groups are $C_{1-4}$ primary or secondary alkyl groups, i.e., methyl, ethyl, propyl or butyl with methyl being more preferred. The most preferred moieties are resorcinol moieties, in which p is zero, although moieties in which p is 1 are also excellent with respect to the invention. Said resorcinol moieties are most often bound to isophthalate and/or terephthalate moieties.

Said 1,3-dihydroxybenzene moieties are bound to aromatic dicarboxylic acid moieties which may be monocyclic, e.g., isophthalate or terephthalate, or polycyclic, e.g., naphthalenedicarboxylate. Preferably, the aromatic dicarboxylic acid moieties are isophthalate and/or terephthalate. Either or both of said moieties may be present. For the most part, both are present in a molar ratio of isophthalate to terephthalate in the range of about 0.25–4.0:1, preferably about 0.4–2.5:1, more preferably about 0.67–1.5:1, and most preferably about 0.9–1.1:1.

In the optional soft block units of formula II, resorcinol or substituted resorcinol moieties are again present in ester-forming combination with $R^2$ which is a divalent $C_{3-20}$ aliphatic, alicyclic or mixed aliphatic-alicyclic radical. Preferably, $R^2$ is a $C_{3-20}$ straight chain alkylene, $C_{3-12}$ branched alkylene, or $C_{4-12}$ cyclo- or bicycloalkylene group. More preferably, $R^2$ is aliphatic and especially $C_{8-12}$ straight chain aliphatic.

It is usually found that the arylate polymers most easily prepared, especially by interfacial methods, consist of units of formula II and especially combinations of resorcinol isophthalate and terephthalate units in a molar ratio in the range of about 0.25–4.0:1, preferably about 0.4–2.5: 1, more preferably about 0.67–1.5: 1, and most preferably about 0.9–1.1:1. When that is the case, the presence of soft block units of formula II is usually unnecessary. If the ratio of units of formula II is outside this range, and especially when they are exclusively iso- or terephthalate, the presence of soft block units may be preferred to facilitate interfacial preparation. A particularly preferred arylate polymer containing soft block units is one consisting of resorcinol isophthalate and resorcinol sebacate units in a molar ratio between 8.5:1.5 and 9.5:0.5.

Arylate polymers useful as the base polymer may be prepared by conventional esterification reactions which may be conducted interfacially, in solution, in the melt or under solid state conditions, all of which are known in the art. Typical interfacial preparation conditions are described in copending application Ser. No. 09/030,076, now U.S. Pat. No. 5,916,997, the disclosure of which is incorporated by reference herein.

Also useful as the base polymer are the block copolyestercarbonates disclosed and claimed in abandoned, commonly owned application Ser. No. 09/181,902, the disclosure of which is also incorporated by reference herein. They include block copolymers comprising moieties of the formula

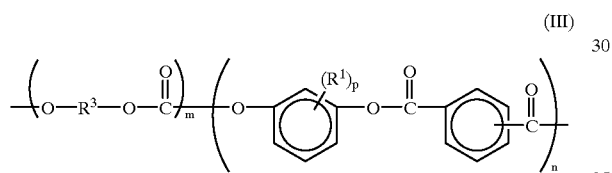

(III)

wherein $R^1$ and p are as previously defined, each $R^3$ is independently a divalent organic radical, m is at least about 10 and n is at least about 4. Soft block moieties corresponding to formula II may also be present. The most preferred moieties are again resorcinol moieties, in which p is zero.

In the organic carbonate blocks, each $R^3$ is independently a divalent organic radical. Preferably, said radical comprises at least one dihydroxy-substituted aromatic hydrocarbon, and at least about 60 percent of the total number of $R^3$ groups in the polymer are aromatic organic radicals and the balance thereof are aliphatic, alicyclic, or aromatic radicals. Suitable $R^3$ radicals include m-phenylene, p-phenylene, 4,4'-biphenylene, 4,4'-bi(3,5-dimethyl)-phenylene, 2,2-bis(4-phenylene)propane, 6,6'-(3,3,3', 3'-tetramethyl-1,1'-spirobi[1H-indan]) and similar radicals such as those which correspond to the dihydroxy-substituted aromatic hydrocarbons disclosed by name or formula (generic or specific) in U.S. Pat. No. 4,217,438, which is incorporated herein by reference. A particularly preferred divalent organic radical is 2,2-bis(p-phenylene)isopropylidene and the dihydroxy-substituted aromatic hydrocarbon corresponding thereto is commonly known as bisphenol A.

Such polyarylates may undergo a Fries rearrangement to form hydroxybenzophenone moieties. One of the properties of such moieties is their capability of absorbing ultraviolet radiation in the 300–400 nm region, and particularly in the 380–390 nm region. Thus, they have been found to provide protection against photodegradation for dyes which also absorb in this region.

A number of such dyes are known in the art, and component B of the compositions of the invention comprises any of such dyes singly or in combination. They include phthalocyanine, anthraquinone, perinone, azo, quinophthalone and methine dyes. Illustrations are:

FILESTER BLUE GN: an (alkylamino)sulfonated copper phthalocyanine

DISPERSE RED 60:

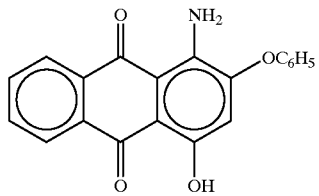

DIARESIN RED K:

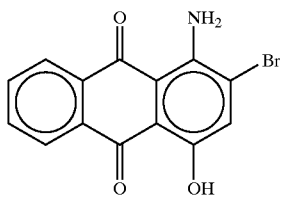

COLORPLAST RED LB:

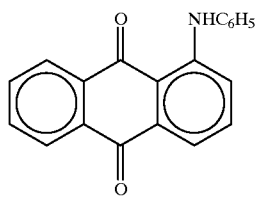

MACROLEX VIOLET B:

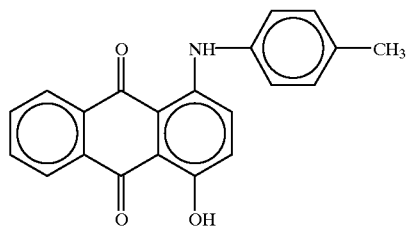

AMAPLAST YELLOW GHS:

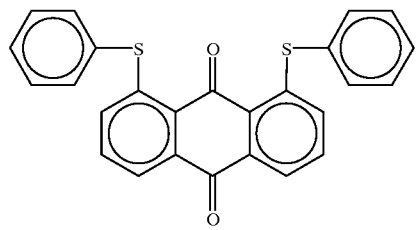

AMAPLAST ORANGE LFP:

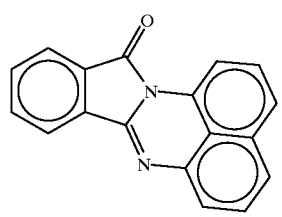

SOLVENT RED 195: a heterocyclic monoazo dye

MACROLEX VIOLET 3R:

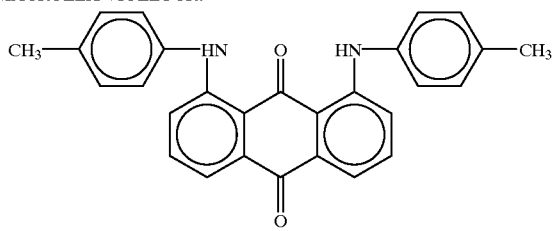

MACROLEX YELLOW G:

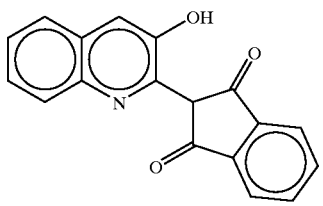

MACROLEX YELLOW 3G:

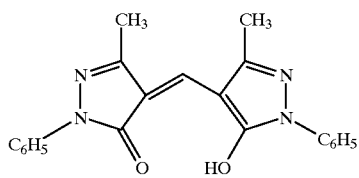

MACROLEX YELLOW 6G:

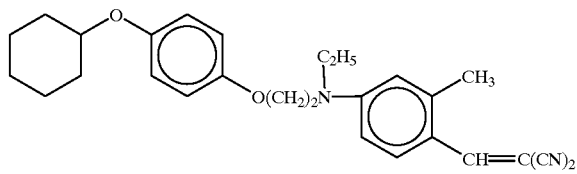

It should be noted that other dyes are known to be sensitive to wavelengths in other regions of the spectrum, and their performance and stability may not be enhanced by combination with arylate polymers comprising component A. Examples of such dyes, the use of which is not considered part of the invention and the identities of which will be apparent to those skilled in the art or may be determined by simple experimentation, are various blue and green derivatives of 1,4-diaminoanthraquinone which are sensitive to wavelengths in the range of about 425–600 nm.

A significant advantage of the compositions of the invention which comprise components A and B, hereinafter sometimes "2-component compositions", is the fact that they can be blended with other resins to form compositions comprising components A, B and C, hereinafter sometimes "3-component compositions". Said 3-component compositions are themselves colored and are expected to have improved color stability when compared with simple blends of components B and C.

Resins suitable for use as component C are of virtually any molecular structure and include natural and synthetic, thermosetting or thermoset and thermoplastic resins. Blends of any of such resins may also be employed.

Natural resins include cellulosic resins and rubber. Of the synthetic resins, which are often preferred, thermoset and thermosetting resins include those derived from epoxy compounds, cyanate esters, unsaturated polyesters, diallyl phthalate, acrylics, alkyds, phenol-formaldehyde (including novolaks and resoles), melamine-formaldehyde, urea-formaldehyde, bismaleimides, PMR resins, benzocyclobutanes, hydroxymethylfurans and isocyanates.

Thermoplastic resins include addition and condensation polymers. Condensation polymers are exemplified by polyesters, polyamides, polyethersulfones, polyetherketones, polyphenylene ethers, polyphenylene sulfides, polyimides and polyurethanes.

Illustrative addition polymers include homopolymers and copolymers of the following:

Esters of unsaturated alcohols, such as allyl and vinyl alcohols and butenediol, with saturated acids such as acetic, propionic, butyric, valeric, caproic and stearic; with unsaturated acids such as acrylic and methacrylic, with polybasic acids such as oxalic, succinic and adipic; with unsaturated polybasic acids such as maleic and fumaric; and with aromatic acids, e.g., benzoic, phthalic and terephthalic acids.

Esters of saturated alcohols, such as methyl, ethyl, propyl, isopropyl, butyl, isobutyl, sec-butyl, tert-butyl, 2-ethylhexyl and cyclohexyl alcohols, ethylene glycol and diethylene glycol, with unsaturated aliphatic monobasic and polybasic acids, examples of which appear above.

Vinyl cyclic compounds, including styrene, methylstyrenes, divinylbenzene, vinylpyridines and N-vinylpyrrolidinone.

Unsaturated ethers such as methyl vinyl ether.

Unsaturated ketones, e.g., methyl vinyl ketone and ethyl vinyl ketone.

Unsaturated amides, e.g., acrylamide, methacrylamide, N-methylacrylamide, diacetone acrylamide and 2-acrylamido-2-methylpropanesulfonic acid and salts thereof.

Unsaturated aliphatic hydrocarbons, for instance, ethylene, propylene, isobutene, butadiene, isoprene, 2-chlorobutadiene and ot-olefins in general.

Vinyl halides, e.g., vinyl fluoride, vinylidene fluoride, vinyl chloride and vinylidene chloride.

Unsaturated acids, examples of which appear above.

Unsaturated acid anhydrides, e.g., maleic anhydride.

Unsaturated nitriles, e.g., acrylonitrile and methacrylonitrile.

The preferred addition polymers include homopolymers and copolymers, especially homopolymers of alkenylaromatic compounds, such as polystyrene, including syndiotactic polystyrene, and copolymers of alkenylaromatic compounds with ethylenically unsaturated nitriles, such as acrylonitrile and methacrylonitrile; dienes, such as butadiene and isoprene; and/or acrylic monomers, such as ethyl acrylate. These latter copolymers include the ABS (acrylonitrile-butadiene-styrene) and ASA (acrylonitrile-styrene-alkyl acrylate) copolymers.

The preferred polymers for use under many conditions as component C are polycarbonates (hereinafter sometimes designated "PC"), polyesters, polyetherimides, polyphenylene ethers and addition polymers. Related blends are disclosed in copending, commonly owned application Ser. No. 09/152,877, the disclosure of which is incorporated by reference herein.

The polycarbonates in the 3-component compositions are most preferably bisphenol A homo- and copolycarbonates. Polyesters are illustrated by poly(alkylene dicarboxylates), especially poly(ethylene terephthalate) (hereinafter sometimes designated "PET"), poly(1,4-butylene terephthalate) (hereinafter sometimes designated "PBT"), poly (trimethylene terephthalate), poly(ethylene naphthalate), poly(butylene naphthalate), poly(cyclohexanedimethanol terephthalate), poly(cyclohexanedimethanol-co-ethylene terephthalate) and poly(1,4-cyclohexanedimethyl-1,4-cyclohexanedicarboxylate), and especially poly(alkylene arenedioates), with PET and PBT being preferred.

Copolyestercarbonates may also be used. They comprise, in addition to the organic carbonate units, ester units such as isophthalate and/or terephthalate. The copolyestercarbonates which find use in the instant invention and the methods for their preparation are well known in the art as disclosed in, for example, U.S. Pat. Nos. 3,030,331, 3,169,121, 3,207,814, 4,194,038, 4,156,069, 4,238,596, 4,238,597, 4,487,896 and 4,506,065.

Suitable base polymer blends may comprise miscible, immiscible and compatibilized blends including, but not limited to, PC/ABS, PC/ASA, PC/PBT, PC/PET, PC/polyetherimide, polyester/polyetherimide, polyphenylene ether/polystyrene, polyphenylene ether/polyamide and polyphenylene ether/polyester.

The 2-component and 3-component compositions of the invention may be prepared by such conventional operations as solvent blending and melt blending. A particularly preferred method for blend preparation is melt blending such as by extrusion. The blends may additionally contain art-recognized additives including impact modifiers, UV screeners, flame retardants, fillers, stabilizers, flow aids, ester interchange inhibitors and mold release agents. It is intended that the blend compositions include simple physical blends and any reaction products thereof, as illustrated, for example, by polyester-polycarbonate transesterification products.

The amount of component B in the compositions of the invention is typically an amount effective to impart coloration thereto. This is most often an amount in the range of about 0.01–5.0% by weight based on total resin.

Resin proportions in the 3-component compositions are subject to wide variation. In general, component A will be present in an amount effective to impart color stability. Since the surface portion of a resinous article receives the predominant amount of radiation, the presence of component A in the surface region is most important. This may be achieved by preparing a simple blend of the resins or by fabricating a multilayer article with component A, in combination with component B, constituting the surface layer. Simple blends may, for example, contain about 5–60% by weight of component A based on total resin.

The invention is illustrated by the following examples.

EXAMPLES 1–12

The arylate polymer employed was a block copolyestercarbonate containing 50 mole percent bisphenol A carbonate units and 50 mole percent resorcinol isophthalate/terephthalate units (50 mole percent isophthalate). Samples (2 grams) of the resin were dissolved with 10 milligrams (mg) of dye in 8 milliliters (ml) of chloroform. Films were cast using a 10 mil doctor blade and the solvent was to provide resin films with a thickness of 26–32 microns.

The films were placed in slide holders and exposed in a Ci35A weatherometer (B/B filter, 0.77 watts per square meter [W/m$^2$]) to a total exposure in the range of 2,000–2,200 kilojoules (kJ). The optical density ratios ("ODR") of the weathered to the corresponding unweathered samples were determined and compared with controls in which the polymer was a commercially available bisphenol A polycarbonate and the solvent was methylene chloride. The results are given in the following table.

| Example | Dye | ODR, example | ODR, control | % increase |
|---|---|---|---|---|
| 1 | FILESTER BLUE GN | 0.710 | 0.287 | 248 |
| 2 | FILESTER RED TBG | 0.702 | 0.391 | 180 |
| 3 | DIARESIN RED K | 0.772 | 0.395 | 195 |
| 4 | COLORPLAST RED LB | 0.813 | 0.563 | 144 |
| 5 | MACROLEX VIOLET B | 0.759 | 0.519 | 146 |
| 6 | AMAPLAST YELLOW GHS | 0.811 | 0.677 | 120 |
| 7 | AMAPLAST ORANGE LFP | 0.665 | 0.469 | 142 |
| 8 | THERMOPLAST RED 454 | 0.673 | 0.453 | 149 |
| 9 | MACROLEX VIOLET 3R | 0.716 | 0.452 | 158 |
| 10 | MACROLEX YELLOW G | 0.183 | 0.064 | 287 |
| 11 | MACROLEX YELLOW 3G | 0.771 | 0.377 | 205 |
| 12 | MACROLEX YELLOW 6G | 0.398 | 0.131 | 304 |

The effect of the arylate polymer on the color stability of the dye is apparent from the table.

What is claimed is:

1. A resinous composition comprising the following and any reaction products thereof:
   (A) a block copolyestercarbonate comprising structural units of the formula

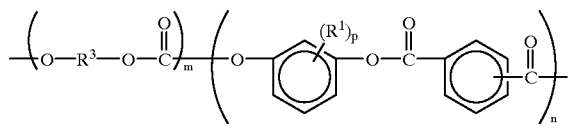

(III)

wherein each R$^1$ is a substituent, each R$^3$ is 2,2-bis(p-phenylene)isopropylidene, m is at least about 10, n is at least about 4 and p is 0; and
   (B) at least one dye which undergoes chemical degradation upon exposure to ultraviolet radiation in the wavelength range of 300–400 nm.

2. The composition according to claim 1 wherein the ester units are mixed isophthalate/terephthalate units.

3. The composition according to claim 1 wherein the amount of component B is in the range of about 0.01–5.0% by weight based on total resin.

4. The composition according to claim 1 wherein component B is selected from the group consisting of phthalocyanine, anthraquinone, perinone, azo, quinophthalone and methine dyes.

5. A resinous composition comprising the following and any reaction products thereof:
   (A) a block copolyestercarbonate comprising structural units of the formula

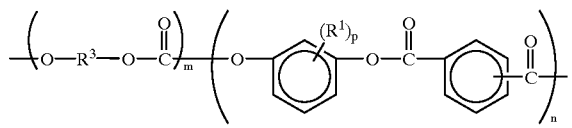

(III)

wherein each R$^1$ is a substituent, each R$^3$ is 2,2-bis(p-phenylene)isopropylidene, m is at least about 10, n is at least about 4 and p is 0;
   (B) at least one dye which undergoes chemical degradation upon exposure to ultraviolet radiation in the wavelength range of 300–400 nm; and (C) at least one resin different from component A.

6. The composition according to claim 5 wherein component C is a natural resin.

7. The composition according to claim 5 wherein component C is a synthetic resin.

8. The composition according to claim 7 wherein component C is a thermoset resin.

9. The composition according to claim 7 wherein component C is a thermoplastic resin.

10. The composition according to claim 9 wherein component C comprises at least one addition polymer.

11. The composition according to claim 10 wherein component C comprises an ABS or ASA resin.

12. The composition according to claim 9 wherein component C comprises at least one condensation polymer.

13. The composition according to claim 12 wherein the condensation polymer is at least one polymer selected from the group consisting of polycarbonates, polyesters, polyetherimides and polyphenylene ethers.

14. A resinous composition comprising the following and any reaction products thereof:

(A) a block copolyestercarbonate comprising structural units of the formula

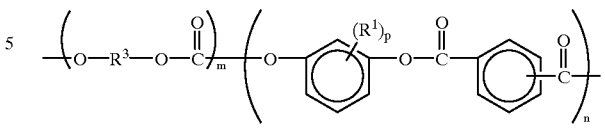

(III)

wherein each $R^1$ is a substituent, each $R^3$ is 2,2-bis(p-phenylene)isopropylidene, m is at least about 10, n is at least about 4 and p is 0, and (B) about 0.01–5.0% by weight, based on total resin, of at least one dye which undergoes chemical degradation upon exposure to ultraviolet radiation in the wavelength range of 300–400 nm, said dye being selected from the group consisting of phthalocyanine, anthraquinone, perinone, azo, quinophthalone and methine dyes.

* * * * *